Oct. 12, 1948.  R. R. TUBBS  2,451,051
SANITARY PIPE CLEANOUT DEVICE
Filed Feb. 18, 1946  2 Sheets-Sheet 1
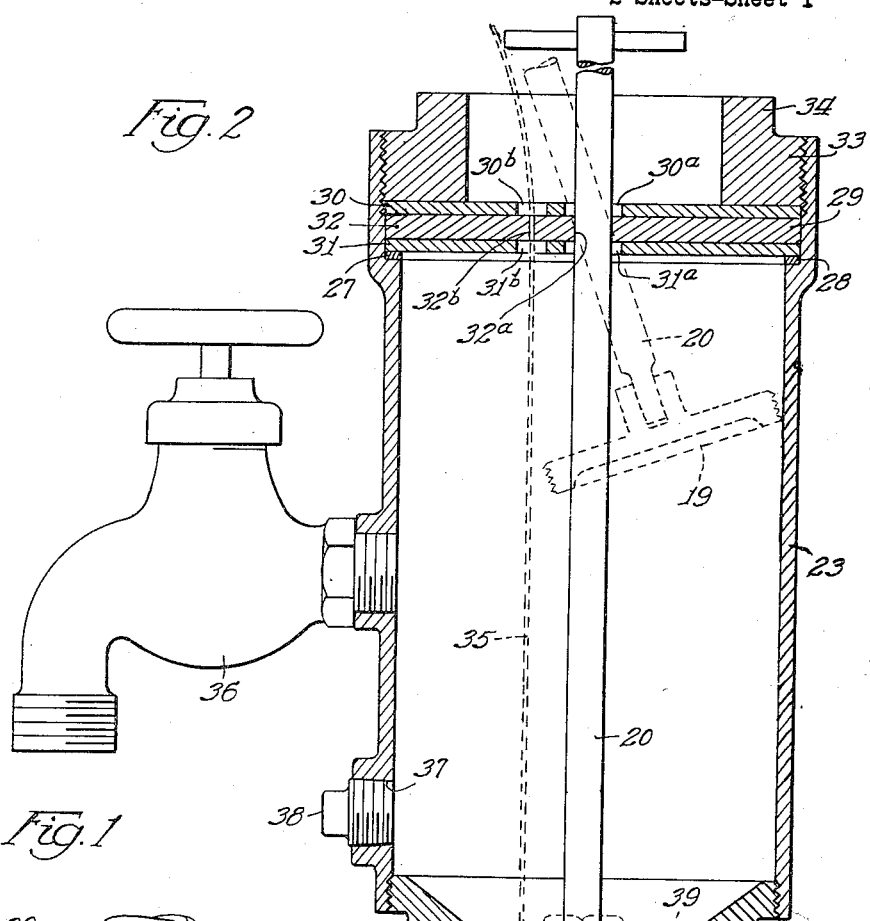
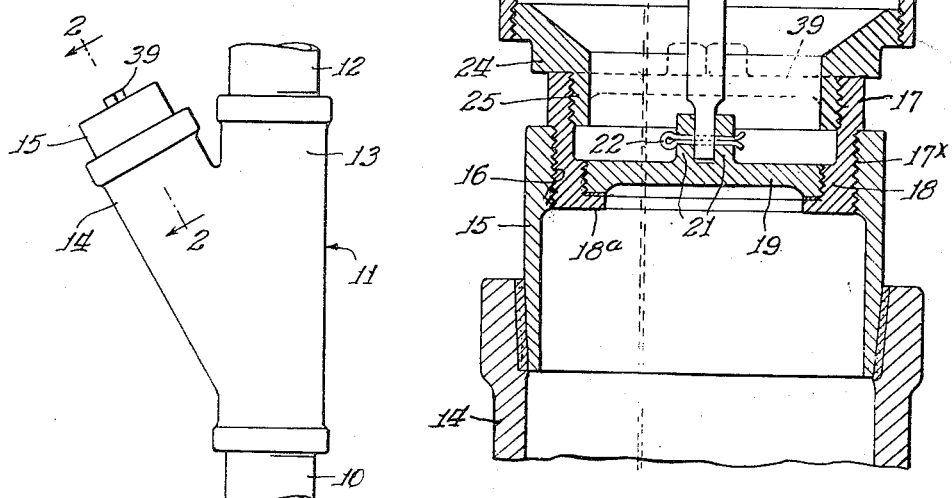
Inventor
Riley R. Tubbs
By: *Skee & Skee* Attys.

Oct. 12, 1948.                    R. R. TUBBS                    2,451,051
                         SANITARY PIPE CLEANOUT DEVICE
Filed Feb. 18, 1946                                          2 Sheets-Sheet 2
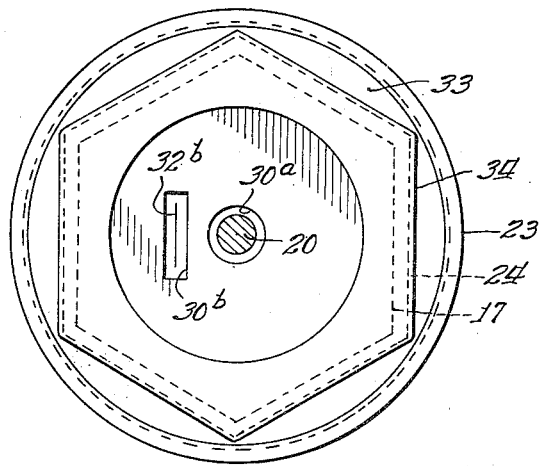
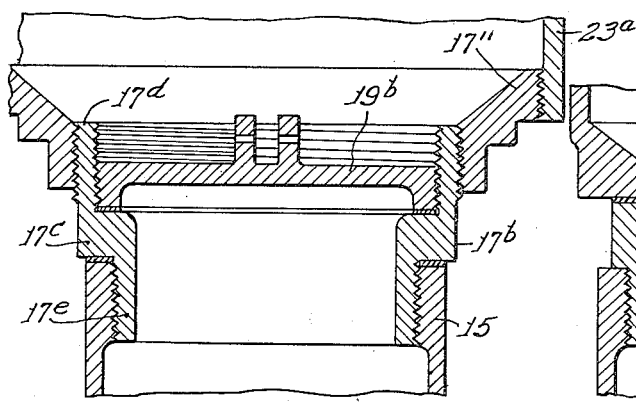
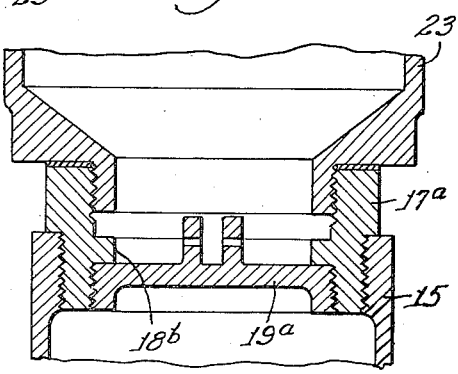
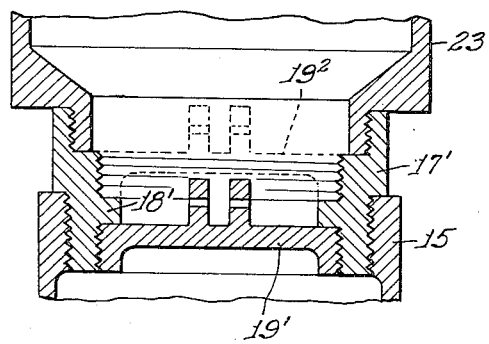
Inventor
Riley R. Tubbs
By
       Attys.

Patented Oct. 12, 1948

2,451,051

UNITED STATES PATENT OFFICE 2,451,051

SANITARY PIPE CLEANOUT DEVICE

Riley R. Tubbs, Great Bend, Kans.

Application February 18, 1946, Serial No. 648,289

5 Claims. (Cl. 15—104.30)

1

This invention relates to a pipe cleanout device and its principal object is to provide a device whereby a plumber's tape or other pipe cleanout tool may be inserted into a pipe without any danger of foul water or gas gushing therefrom.

It is well known that sometimes the soil or sewer pipe in a house becomes clogged to such an extent that the water will not flow through it and often the water stands in the soil pipe which leads up from the usual Y fitting which connects the sewer and soil pipes. The cleanout tool is inserted through one branch of the Y fitting into the sewer pipe in order to dislodge the mass collected therein.

In ordinary practice this branch of the Y fitting is closed by a screw plug which must be removed to permit the cleanout tool to be inserted, and when the level of the water in the sewer and soil pipes is higher than the Y fitting it gushes out through the opened branch of the Y fitting causing a great deal of annoyance and sometimes considerable damage.

In accordance with the present invention, an adapter is substituted for the screw plug, in which adapter is secured a screw plug. To remove the screw plug in accordance with the present invention, a cylinder, closed at its upper end is screwed into the adapter, the screw plug unscrewed and the cleanout tool inserted through the top of the cylinder and pushed into the Y fitting and into the sewer pipe.

Another object is to provide a cleanout device of simple and improved construction, easy to manipulate and eliminating the possibility of water or gas to escape into the room.

With these and other objects and advantages in view, this invention consists in the several novel features of construction, arrangement and combination of parts hereinafter fully set forth and more particularly defined in the appended claims.

The invention is clearly illustrated in the drawing accompanying this specification, in which:

Fig. 1 is a side elevation of an ordinary Y fitting interposed between a soil pipe and a sewer pipe;

Fig. 2 is an enlarged longitudinal section taken on the line 2—2 of Fig. 1 and showing the cleanout device applied to the Y fitting, the view being shown in an upright position;

Fig. 3 is a plan of the cylinder portion of the device;

Fig. 4 is a fragmental, longitudinal section showing a slightly modified form of the invention;

Fig. 5 is a fragmental longitudinal section illustrating a second modification; and Fig. 6 is a fragmental longitudinal section illustrating a third modification.

Referring to said drawings and first to Figs. 1 to 3 inclusive, the reference character 10 designates a fragment of a sewer pipe having a conventional Y fitting 11 secured upon its upper end, and 12 is a fragment of a soil pipe secured to one branch 13 of the Y fitting and extending up therefrom into the room or rooms of a building in which the pipes are contained.

Secured in the branch 14 of the Y fitting as by cement is a ferrule 15, the upper end of which is internally screw threaded as at 16. Threadedly mounted in the screw threaded end of the ferrule is a hollow adapter 17 having external screw threads 17x for engaging the screw threads 16 of the ferrule. At its lower end the adapter is formed with an internally screw threaded internal flange 18 formed with an annular shoulder or ledge 18a at its lower edge. The function of the shoulder or ledge is to protect the internal screw threads or the flange 18 from injury by the cleanout tool when moved back and forth in a Y fitting and sewer pipe in loosening the mass which was clogging the same. The opening formed by the internally screw threaded flange 18 is closed by a screw plug 19 which may be unscrewed upwardly to uncover this opening and said screw plug is formed with means for connection with a rod 20, whereby the plug may be unscrewed or screwed back into the adapter. As shown, two ears 21 are formed upon the screw plug to which the rod may be fastened by a cotter pin 22 or the like. The rod 20 is not connected to the screw plug except at such times as the sewer pipe is to be cleaned.

A cylinder 23 is employed when the sewer pipe is to be cleaned. The upper end of the cylinder is closed by a sealing device and its lower end is provided with a nipple 24 having an externally threaded neck 25 which may be screwed upon the threaded upper end of the adapter, whereby to connect the cylinder therewith. The nipple may be secured to the cylinder by a threaded connection therewith or otherwise.

The upper end of the cylinder is offset outward radially to leave an annular internal shoulder 27 and upon this shoulder is placed a gasket 28, upon which is placed the sealing device 29, here shown as comprising two metal discs 30, 31 and a rubber or other compressible disc 32 therebetween. The upper end of the cylinder is internally bolt threaded to receive a bolt threaded ring 33 formed with a hexagonal or other many sided neck 34 to which a wrench or other tool may be applied. When the ring is screwed down tight, a leak proof joint is formed between the cylinder and the sealing device.

Centrally located in the discs 30, 31 are registering holes 30a, 31a of slightly greater diameter than that of the rod 20, and in the rubber disc, between the holes 30a, 31a, is a hole 32a of the same or less diameter than that of the rod whereby the wall of the hole 32a will closely hug the rod and prevent leakage around the same. In the discs 30, 31 at one side of the center thereof are holes 30b, 31b and in the rubber disc 32, between the holes 30b, 31b, is a slit 32b. A flat narrow cleanout tape 35 or other cleanout tools is inserted into the cylinder through the holes 30b, 31b and slit 32b. The walls of the slit closely hug the cleanout tool and prevent leakage past the rubber disc.

An ordinary faucet 36 may be secured in the wall of the cylinder to which a hose may be attached when it is desired to flush out the cylinder and sewer pipe, and an opening 37 may be provided in the cylinder wall which is normally closed by a screw plug 38. The screw plug 38 may be removed and a pipe screwed into the opening 37 for use in flushing out the cylinder.

If desired, a screw plug 39 may be screwed into the upper end of the adapter to cover the screw plug 19.

In use the screw plug 39 is first unscrewed and the rod 20 is fastened upon the ears 21 of the screw plug 19 by the cotter pin 22. The cylinder 23 is then slipped over the rod and screwed upon the adapter 17. The tape or other cleanout tool is then inserted through the holes 30b, 31b and slit 32b. The rod 20 is then turned in a contraclockwise direction, thereby unscrewing the plug 19 from the adapter, permitting the water, if any, to enter the cylinder. The rod is lifted approximately to a point indicated by the dotted lines in Fig. 2 and tilted somewhat and the screw plug allowed to swing into an inclined position disposed entirely at one side of the holes 30b, 31b, permitting the tape or other cleanout tool to be pushed down through the cylinder, through the Y fitting and into the sewer pipe, wherein it may be worked back and forth in the customary manner to loosen up the mass clogging the sewer pipe. The pivotal connection between the rod 20 and plug 19 permits the latter to swing even further from the path of the tool than that of the dotted line position shown in Fig. 2.

When the clogged matter has been loosened, the cylinder and sewer pipe may be flushed out with clean water through the faucet 36. After the sewer pipe has been cleaned out, the tape or other cleanout tool 35 is withdrawn and the rod is lowered to bring the plug 19 into register with the opening in the threaded flange 18 and the rod is then turned in a clockwise direction, thereby screwing the plug down tight, after which the cylinder is removed from the adapter, the rod 20 detached from the screw plug 19, and the plug 39 screwed back in place in the adapter.

In the preferred form of the invention, the screw plug 19 is screwed downward to close the hole in the adapter. In Fig. 4 the screw plug 19a is screwed upward to close the hole in the adapter 17a, and a shoulder 18b is provided above the threaded part of the flange of the adapter to act as a guard to protect the screw threads of the adapter from injury by the tape or other cleanout tool. In other respects the device is constructed substantially the same as the preferred form.

In the form of the invention illustrated in Fig. 5, the adapter 17b is provided with an external annular shoulder 17c which overhangs the top of the ferrule 15. From the flange 17c projects a screw threaded extension 17d upon which the cylinder 23a may be fastened by the nipple 17''. The plug 19b is screwed upon the internally threaded portion of the extension 17d. In other respects the device may be constructed substantially the same as the preferred form. In this form of the device the opening of the adapter is made considerably larger than those of the other forms and the internal screw threads of the adapter are protected by the unthreaded skirt portion 17e of the adapter.

In the form of the invention illustrated in Fig. 6, the adapter $17^1$ is provided with an internal annular flange $18^1$ and with internal screw threads above and below said flange. A screw plug $19^1$ may be screwed upward in the adapter to close the opening therethrough, or a screw plug, shown in dotted lines at $19^2$, may be employed which is screwed down upon the flange $18^1$. In other words, this form of the invention is adapted for screw plugs that screw downwardly or upwardly.

While the invention has been shown and described in connection with a cleanout device for sewer pipes, obviously it has many other uses and may be used for cleaning out all kinds of pipes, whether containing water, gas or other liquids.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a pipe cleanout device, the combination of an adapter arranged for connection with a ferrule, and being formed with an opening therethrough, a screw plug screwed into said opening, a rod for rotating said screw plug adapted to be pivotally connected to and disconnected from said screw plug, and said rod forming the support for the plug when the latter is unscrewed from the adapter, a cylinder arranged at its bottom for connection with the adapter, said cylinder being closed at its upper end with a sealing device, and said rod being arranged to extend out through said sealing device, said sealing device having an opening therein through which a cleanout tool may be inserted into the cylinder.

2. In a pipe cleanout device, the combination of an annular adapter having screw threads on its inner face and a flange projecting inwardly beyond said screw threaded portion, a screw plug screwed into said adapter, a rod for rotating the screw plug adapted to be pivotally connected thereto and disconnected therefrom, and said rod forming the support for the plug when the latter is unscrewed from the adapter, a cylinder arranged at its lower end with connections to said adapter, said cylinder being closed at its upper end with a sealing device, and said rod being arranged to extend out through said sealing device, said sealing device having a slit therethrough through which an elongated cleanout tool may be inserted into the cylinder.

3. In a pipe cleanout device, the combination of an adapter arranged for connection with a ferrule, and being formed with a threaded opening therethrough and an inwardly projecting annular flange, a screw plug screwed into said threaded opening, a rod for rotating said screw plug adapted to be pivotally connected to and disconnected from said screw plug, and said rod forming the support for the plug when the latter is unscrewed from the adapter, a cylinder having external screw threads at its bottom for connection with the adapter, a sealing device closing the upper end of the cylinder, and said rod being arranged to extend out through said sealing device, said sealing device having an opening therein through which a cleanout tool may be inserted into the cylinder.

4. In a pipe cleanout device, the combination of an annular adapter having screw threads on its inner face and a flange projecting inward beyond said screw threaded portion, a screw plug screwed into said adapter, a rod for rotating the screw plug adapted to be pivotally connected thereto and disconnected therefrom, and said rod forming the support for the plug when the latter is unscrewed from the adapter, a cylinder having external screw threads at its lower end for connection with said adapter, a sealing device closing the upper end of the cylinder, and said rod being arranged to extend out through said sealing device, said sealing device having an opening therethrough through which an elongated cleanout tool may be inserted into the cylinder.

5. In a pipe cleanout device, a cylinder open at its upper end, and having an annular internal shoulder adjacent its upper end, a gasket resting upon said shoulder, a pair of metal discs, a compressible disc between said pair of discs and a ring threadedly secured in the upper end of the cylinder and adapted to bear against said discs, the metal discs having centrally located holes, a rod of considerably less diameter than said holes extending therethrough and capable of being tilted therein, a plug pivotally connected to said rod, said discs having other holes through which a cleanout tool may be inserted and the compressible disc having a centrally located hole, the wall of which fits tightly against the rod and the compressible disc having also a slit therein registering with said other holes through which a cleanout tool may be moved.

RILEY R. TUBBS.

REFERENCES CITED

The following references are of record in the file of this patent:

UNITED STATES PATENTS

| Number | Name | Date |
|---|---|---|
| 518,008 | Riling | Apr. 10, 1894 |
| 1,595,186 | Gray | Aug. 10, 1926 |
| 1,623,843 | Klinck | Apr. 5, 1927 |
| 2,176,553 | Walz et al. | Oct. 17, 1939 |
| 2,219,897 | Hooper et al. | Oct. 29, 1940 |
| 2,241,560 | Schouler | May 13, 1941 |
| 2,287,750 | Clayton | June 23, 1942 |
| 2,397,844 | Dewhurst | Apr. 2, 1946 |

FOREIGN PATENTS

| Number | Country | Date |
|---|---|---|
| 54,298 | Germany | Nov. 6, 1890 |